(12) United States Patent
Wachman et al.

(10) Patent No.: US 9,137,500 B1
(45) Date of Patent: Sep. 15, 2015

(54) POINT OF SALE INTEGRATION WITH VIDEO ANALYTICS FOR FRAUD DETECTION

(75) Inventors: Eran Wachman, Hampstead (CA); Boaz Dudovich, Rehovot (IL)

(73) Assignee: VERINT SYSTEMS, INC., Santa Clara, CA (US)

( * ) Notice: Subject to any disclaimer, the term of this patent is extended or adjusted under 35 U.S.C. 154(b) by 949 days.

(21) Appl. No.: 13/316,218

(22) Filed: Dec. 9, 2011

Related U.S. Application Data

(60) Provisional application No. 61/421,845, filed on Dec. 10, 2010.

(51) Int. Cl.
*H04N 7/18* (2006.01)
*G06K 9/00* (2006.01)

(52) U.S. Cl.
CPC ............ *H04N 7/181* (2013.01); *G06K 9/00771* (2013.01)

(58) Field of Classification Search
CPC .......................... H04N 7/181; G06K 9/00771

USPC .................................................. 348/143, 150
See application file for complete search history.

(56) References Cited

U.S. PATENT DOCUMENTS

2007/0182818 A1\* 8/2007 Buehler ...................... 348/143

\* cited by examiner

*Primary Examiner* — Allen Wong
(74) *Attorney, Agent, or Firm* — Meunier Carlin & Curfman

(57) ABSTRACT

A method of operating a video system to detect fraudulent return transactions comprises receiving an indication of a return transaction from a point of sale system, wherein the indication of the return transaction indicates a time when the return transaction occurred. The method further comprises receiving video data of an area proximate to the point of sale system captured at the time when the return transaction occurred. The method further comprises processing the video data to determine whether a first person is located in a return area and whether a second person is located proximate to the point of sale system. The method further comprises determining whether the return transaction is legitimate or fraudulent based on whether the first person is located in the return area and whether the second person is located proximate to the point of sale system.

18 Claims, 8 Drawing Sheets

POINT OF SALE INTEGRATION WITH VIDEO ANALYTICS FOR FRAUD DETECTION

RELATED APPLICATIONS

This application claims the benefit of U.S. provisional application entitled "POINT OF SALE INTEGRATION WITH VIDEO ANALYTICS FOR FRAUD DETECTION AND CONVERSION RATE DETERMINATION" having Ser. No. 61/421,845 filed on Dec. 10, 2010, which is entirely incorporated herein by reference.

TECHNICAL FIELD

Aspects of the invention are related, in general, to the field of video processing and, more specifically, to fraud detection of return transactions at a point of sale system and determining item conversion rates.

TECHNICAL BACKGROUND

Commercial enterprises, such as retail establishments, attempt to carefully monitor store inventory and the details of sales and return transactions with customers. Typically, a sales clerk operates a point of sale system or cash register to conduct sales and return transactions. When monitoring customer transactions, store owners are often concerned with detecting fraud and, in particular, fraudulent sales and return transactions. Unfortunately, the perpetrators of a fraudulent return transaction are often the employees entrusted to operate the point of sale system.

Another area of concern to an owner of a retail establishment is conversion rate statistics. A conversion rate is a metric that relates a number of customers who enter an area, such as a retail establishment, to a number of sales transactions that occur during a time period. Typically, a conversion rate is expressed as a percentage of sales relative to a number of shoppers. Retailers may utilize conversion rate statistics to determine which products are selling well, and which areas of the store are producing the most sales per shopper.

OVERVIEW

A method of operating a video system to detect fraudulent return transactions is disclosed. The method comprises receiving an indication of a return transaction from a point of sale system, wherein the indication of the return transaction indicates a time when the return transaction occurred. The method further comprises receiving video data of an area proximate to the point of sale system captured at the time when the return transaction occurred. The method further comprises processing the video data to determine whether a first person is located in a return area and whether a second person is located proximate to the point of sale system. The method further comprises determining whether the return transaction is legitimate or fraudulent based on whether the first person is located in the return area and whether the second person is located proximate to the point of sale system.

In an embodiment, a computer-readable medium has stored thereon program instructions for operating a video system to detect fraudulent return transactions, wherein the program instructions, when executed by a computer system, direct the computer system to receive an indication of a return transaction from a point of sale system, wherein the indication of the return transaction indicates a time when the return transaction occurred. The program instructions further direct the computer system to receive video data of an area proximate to the point of sale system captured at the time when the return transaction occurred. The program instructions further direct the video source system to process the video data to determine whether a first person is located in a return area and whether a second person is located proximate to the point of sale system. The program instructions further direct the video source system to determine whether the return transaction is legitimate or fraudulent based on whether the first person is located in the return area and whether the second person is located proximate to the point of sale system.

In an embodiment, determining whether the return transaction is legitimate or fraudulent based on whether the first person is located in the return area and whether the second person is located proximate to the point of sale system comprises determining that the return transaction is legitimate when the first person is located in the return area and the second person is located proximate to the point of sale system.

In an embodiment, determining whether the return transaction is legitimate or fraudulent based on whether the first person is located in the return area and whether the second person is located proximate to the point of sale system comprises determining that the return transaction is legitimate when the first person is located in the return area, no person is located proximate to the point of sale system, and the second person is located proximate to a different point of sale system.

In an embodiment, determining whether the return transaction is legitimate or fraudulent based on whether the first person is located in the return area and whether the second person is located proximate to the point of sale system comprises flagging the return transaction as potentially fraudulent when the first person is located in the return area, the second person is located proximate to the different point of sale system, and a third person is located proximate to the point of sale system.

In an embodiment, determining whether the return transaction is legitimate or fraudulent based on whether the first person is located in the return area and whether the second person is located proximate to the point of sale system comprises flagging the return transaction as potentially fraudulent when the first person is not located in the return area and the second person is located proximate to the point of sale system.

In an embodiment, the return transaction is provided for review if the return transaction is determined to be fraudulent.

In an embodiment, receiving the video data of the area proximate to the point of sale system captured at the time when the return transaction occurred comprises, in response to receiving the indication of the return transaction from the point of sale system, requesting the video data captured at the time when the return transaction occurred and responsively receiving the video data of the area proximate to the point of sale system captured at the time when the return transaction occurred.

In an embodiment, processing the video data to determine whether the first person is located in the return area and whether the second person is located proximate to the point of sale system comprises analyzing the video data to identify the return area and an area proximate to the point of sale system.

In an embodiment, analyzing the video data to identify the return area comprises analyzing the video data to recognize predetermined coordinates of the return area relative to the video data.

In an embodiment, a method of operating a video system to detect fraudulent return transactions is disclosed. The method comprises receiving an indication of a return transaction from a point of sale system, wherein the indication of the return transaction indicates a time when the return transaction occurred. The method further comprises receiving video data of an area proximate to the point of sale system captured at the time when the return transaction occurred. The method further comprises processing the video data to determine whether a first person is located in a return area and whether a second person is located proximate to the point of sale system. The method further comprises, if the first person is located in the return area and the second person is located proximate to the point of sale system, determining that the return transaction is legitimate. The method further comprises, if the first person is located in the return area, no person is located proximate to the point of sale system, and the second person is located proximate to a different point of sale system, determining that the return transaction is legitimate. The method further comprises, if the first person is located in the return area, the second person is located proximate to the different point of sale system, and a third person is located proximate to the point of sale system, flagging the return transaction as potentially fraudulent. The method further comprises, if the first person is not located in the return area and the second person is located proximate to the point of sale system, flagging the return transaction as potentially fraudulent.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiments disclosed herein. On the contrary, the intent is to cover all alternatives, modifications, and equivalents.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
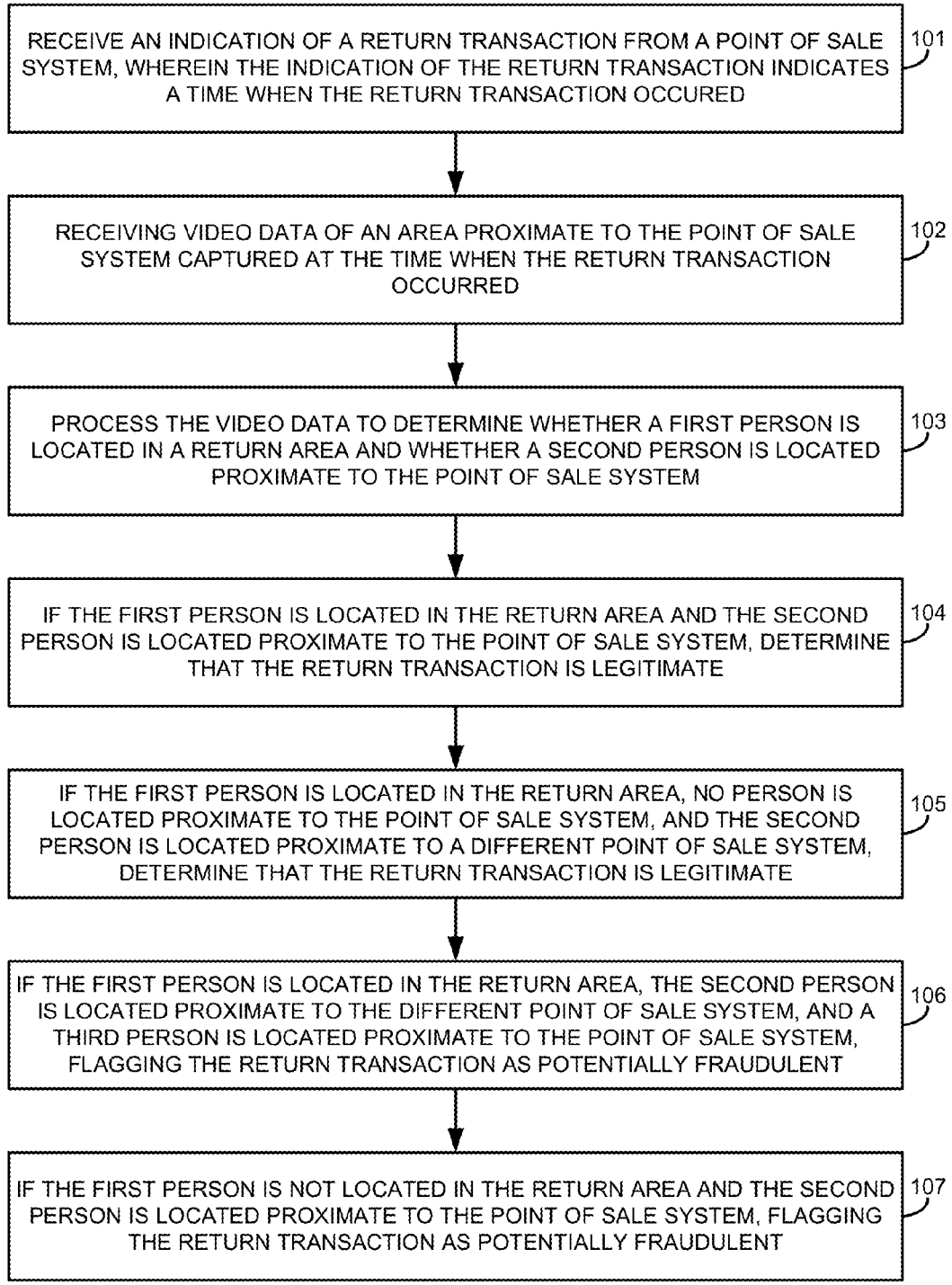
FIG. 1 is a flow diagram of a method according to an embodiment of the invention for operating a video system to detect fraudulent return transactions.

FIG. 1 provides a flow diagram of a method 100 according to an embodiment of the invention for operating a video system to detect fraudulent return transactions. In the method 100, an indication of a return transaction from a point of sale system is received, wherein the indication of the return transaction indicates a time when the return transaction occurred (101). The point of sale system is typically in communication with the video system and provides the indication of the return transaction over a communication network or some other technique of communicating information. For example, the point of sale system could be configured to transmit the indication of the return transaction in response to a store clerk activating a return transaction routine on the point of sale system. In other examples, the point of sale system could be configured to provide the indication of the return transaction at a later time after the return transaction has been completed, such as during a time when network bandwidth is available or after store hours.

The method continues when video data of an area proximate to the point of sale system captured at the time when the return transaction occurred is received (102). The video data could be received prior to, concurrently, or after receiving the indication of the return transaction from the point of sale system. The physical area proximate to the point of sale system, which may be a store or other retail establishment, could include a number of items, such as a return area, check-out lanes, aisles, customers, store clerks, point of sale systems, items for sale, and other objects typically located within a retail establishment. In some examples, a video system may request the video data in response to receiving the indication of the return transaction. For example, the video system may request the video data of the area proximate to the point of sale system associated with the return transaction captured at the time when the return transaction occurred based on the time included in the indication of the return transaction.

The video data is then processed to determine whether a first person is located in a return area and whether a second person is located proximate to the point of sale system (103). Typically, the video system may process the video data to determine the location of the return area by identifying a colored boundary line marked on the floor of the area around the return area, ropes or metal bars designating a return lane, different coloration or markings on the floor of the return area, radio frequency (RF) tags such as an RFID emitted from the return area or the boundary lines of the return area, predetermined coordinates of the return area relative to the video data, or some other technique of identifying the return area. Similar techniques may also be used to identify the point of sale system and the area proximate thereto, including identification of the shape, size, and physical features of the point of sale system in use at the retail establishment. In addition, the first person and the second person can be determined by identifying a shape and size matching that of a human, movement by the person that can be attributed to human motion, facial recognition techniques, clothing worn by the person, such as a uniform, hat, or vest, identification tags, an RF tag emitting an RFID worn by store clerks or employees, or any other technique for analyzing video data to identify humans appearing in the video. Note that the video data could be analyzed in real-time as the video data is captured "live", or could be stored in a storage system and analyzed subsequent to the captured action in post-processing.

If the first person is located in the return area and the second person is located proximate to the point of sale system, the system determines that the return transaction is legitimate (104). In a typical return transaction scenario, the first person located in the return area is a customer attempting to return an item, and the second person located proximate to the point of sale system is a store clerk operating the point of sale system to perform the return transaction on behalf of the customer. In this situation, the video system determines that the return transaction is likely legitimate.

If the first person is located in the return area, no person is located proximate to the point of sale system, and the second person is located proximate to a different point of sale system, the system determines that the return transaction is legitimate (105). In this scenario, the first person located in the return area is likely a customer requesting to return an item previously purchased, and the second person located at the different point of sale system is likely operating the different point of sale system to effectuate the return transaction on that different point of sale system instead of the point of sale system that initially provided the indication of the return transaction to the video system in operation 101. Thus, the video system determines that the return transaction in this situation is also legitimate.

If the first person is located in the return area, the second person is located proximate to the different point of sale system, and a third person is located proximate to the point of sale system, the video system flags the return transaction as potentially fraudulent (106). In this case, although the first person who is located in the return area is likely a customer who may have requested to return an item, since there is a second person located proximate to a different point of sale system and a third person located proximate to the point of sale system, the second person located at the different point of sale system and/or the third person located at the point of sale system could possibly be conducting a fraudulent return transaction. Thus, the video system flags the return transaction as potentially fraudulent in this case.

Finally, if the first person is not located in the return area and the second person is located proximate to the point of sale system, the video system flags the return transaction as potentially fraudulent (107). In this scenario, since no first person is located in the return area, there is no customer attempting to return an item. The second person located proximate to the point of sale system is likely a sales clerk conducting a fraudulent transaction, and so the video system flags the return transaction as potentially fraudulent in this situation.

Advantageously, a video system operating according to the method of FIG. 1 will have a higher likelihood of detecting potentially fraudulent return transactions at a retail establishment, thereby allowing a store owner, manager, supervisor, or some other appropriate individual to review the details of the return transaction to verify any potential fraud that may have occurred. While FIG. 1 may indicate a particular order of execution, other orders of execution, including concurrent or simultaneous execution, may be possible while remaining within the scope of the invention. In another implementation, the method 100 portrayed in FIG. 1 may be embodied as a non-transitory computer readable hardware medium having instructions encoded thereon that are executable on a processing system for implementing the method 100.

Figure 2:
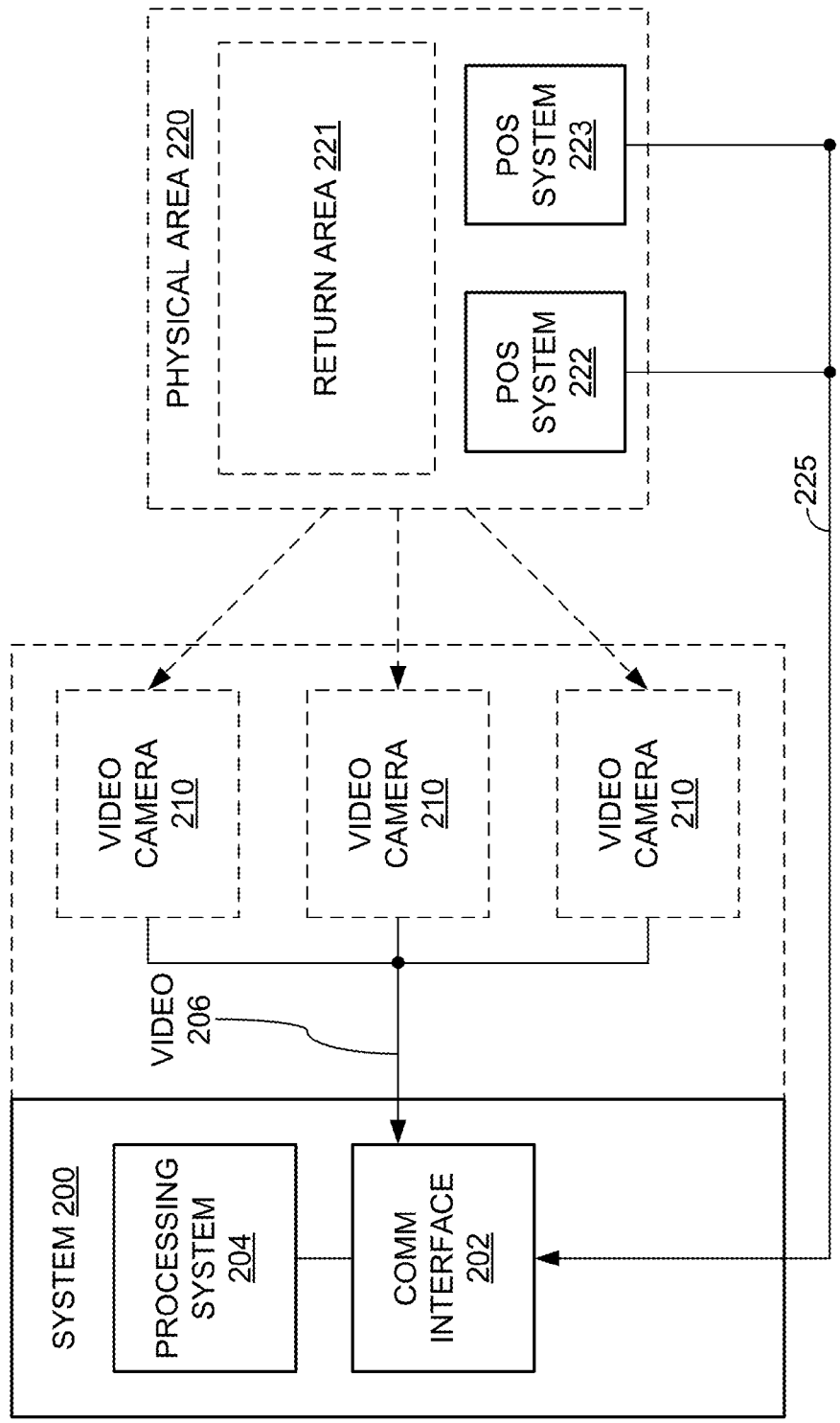
FIG. 2 is a block diagram of a system according to an embodiment of the invention for detecting fraudulent return transactions.

FIG. 2 is a block diagram illustrating a system 200 for detecting fraudulent return transactions. The system 200 includes a communication interface 202 configured to receive video 206 of a return area 221 and one or more point of sale systems 222 and 223 within a physical area 220. In some examples, communication interface 202 is configured to receive video data 206 of an area proximate to a point of sale system 222 and/or 223 at a time when a return transaction occurred. In addition, the communication interface 202 is configured to receive an indication of a return transaction from a point of sale system 222 and/or 223 over communication link 225, wherein the indication of the return transaction indicates a time when the return transaction occurred.

In the example of FIG. 2, the video 206 is generated by one or more video cameras 210 and transferred to the communication interface 202. In one implementation, the video cameras 210 are included as part of the system 200. Also residing in the system 200 is a processing system 204 configured to process the video data 206 to determine whether a first person is located in the return area 221 and whether a second person is located proximate to a point of sale system 222. The processing system 204 is further configured to determine that the return transaction is legitimate if the first person is located in the return area 221 and the second person is located proximate to a point of sale system 222. The processing system 204 is further configured to determine that the return transaction is legitimate if the first person is located in the return area 221, no person is located proximate to the point of sale system 222, and the second person is located proximate to a different point of sale system 223. The processing system 204 is further configured to flag the return transaction as potentially fraudulent if the first person is located in the return area 221, the second person is located proximate to the different point of sale system 222, and a third person is located proximate to the point of sale system 223. The processing system 204 is further configured to flag the return transaction as potentially fraudulent if the first person is not located in the return area 221 and the second person is located proximate to the point of sale system 222.

Figure 3:
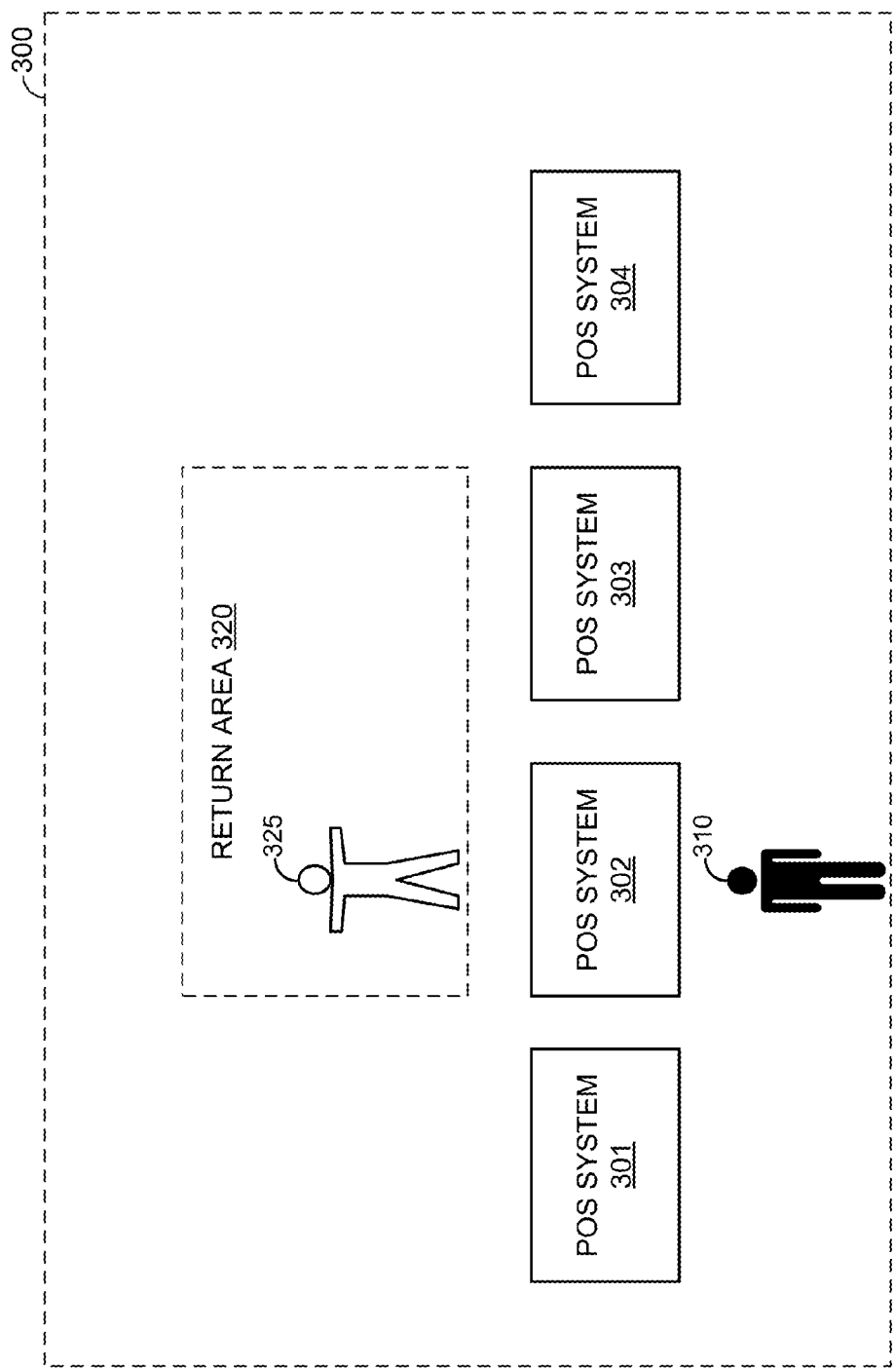
FIG. 3 is a block diagram illustrating a physical area to be analyzed according to an embodiment of the invention, wherein the physical area includes a return area, point of sale systems, and persons located therein.

FIG. 3 is a block diagram illustrating a physical area 300 to be analyzed by the system 200 of FIG. 2 according to an embodiment of the invention. The physical area 300 includes a return area 320, point of sale systems 301-304, and persons 310 and 325 located therein. In one example, the physical area 300 may be the interior of a retail environment, such as a grocery store, department store, or flea market, including items for sale, for rent, or for another purpose. In another implementation, the physical area 300 may be an exhibit or convention hall containing exhibits, booths, displays, or other structures. An amusement park or carnival offering rides, games, and other attractions may be viewed as the physical area 300 in another example. The physical area 300 need not be an enclosed area defined by walls, fences, or similar structures, but may be any area that may be defined or delineated. Other examples of the physical area 400 and the items contained therein may also provide the environment in which the systems and methods disclosed herein operate.

Person 325 is located within return area 320. Return area 320 can be designated in a number of ways so that system 200 is able to determine the area within physical area 300 that comprises return area 320. For example, return area 320 could be designated by lines on the floor, colors, textures, tiles, signs, ropes, bars, or other physical distinctions within physical area 300. In addition, system 200 could be configured to recognize return area 320 by predetermined coordinates, such as Global Positioning System (GPS) coordinates or x-y coordinates relative to the video data 206, or by RFID data broadcast by an active RF tag embedded around or within return area 320.

In the example of FIG. 3, person 310 is standing behind point of sale system 302, while person 325 is located within return area 320. System 200 receives an indication of a return transaction initiated on point of sale system 302. Based on the relative positions of persons 310 and 325, system 200 determines that person 310 is likely a store clerk operating point of sale system 302 to effectuate a return transaction for person 325. Since no other persons are located within physical area 300, system 200 determines that the return transaction initiated on point of sale system 302 is legitimate, and thus does not flag the return transaction as potentially fraudulent.

Figure 4:
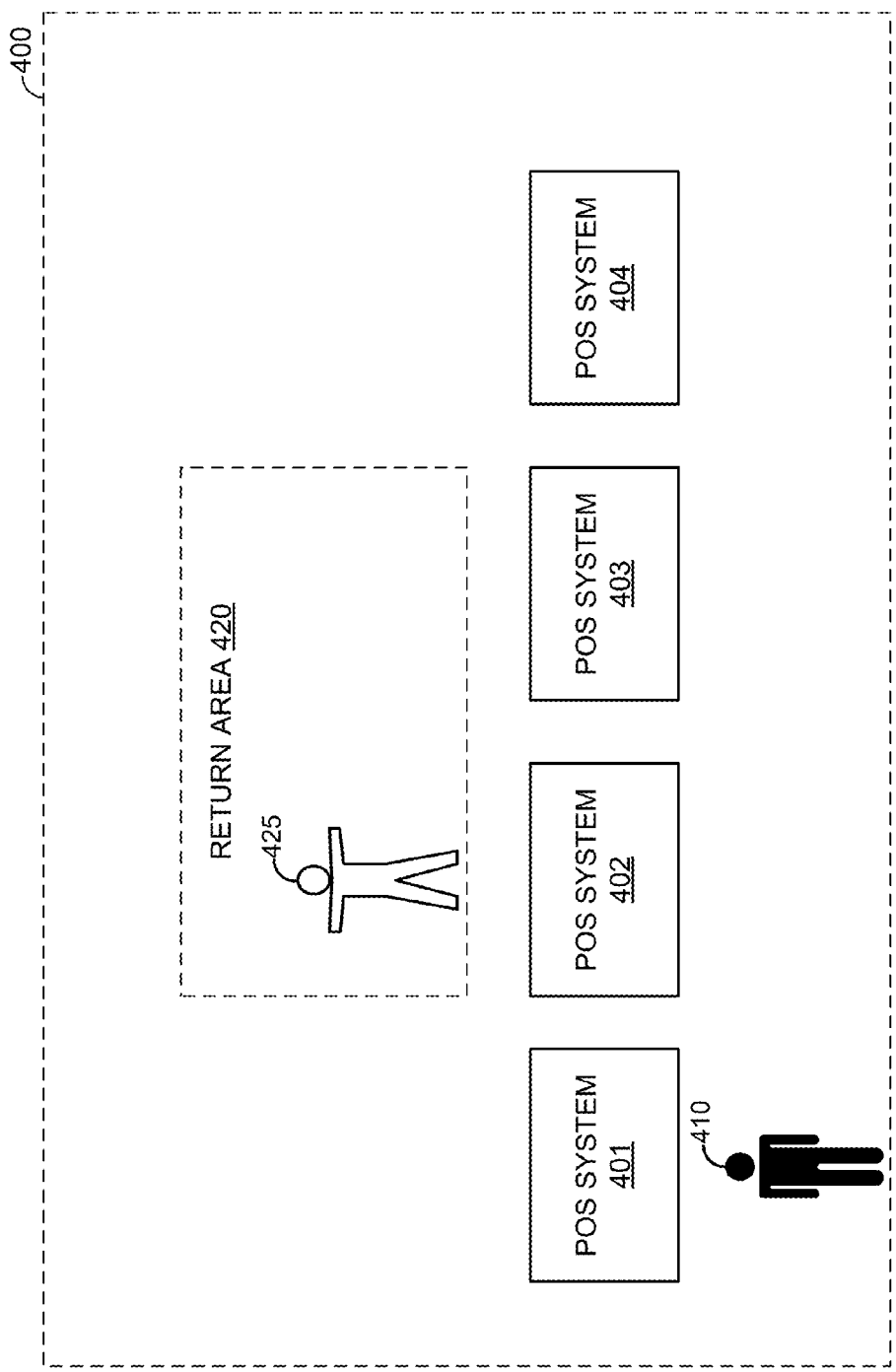
FIG. 4 is a block diagram illustrating a physical area to be analyzed according to an embodiment of the invention, wherein the physical area includes a return area, point of sale systems, and persons located therein.

FIG. 4 is a block diagram illustrating a physical area 400 to be analyzed by the system 200 of FIG. 2 according to an embodiment of the invention. The physical area 400 includes a return area 420, point of sale systems 401-404, and persons 410 and 425 located therein. Person 425 is located within return area 420. Return area 420 can be designated in a number of ways so that system 200 is able to determine the area within physical area 400 that comprises return area 420.

In the example of FIG. 4, person 410 is standing behind point of sale system 401, while person 425 is located within return area 420. System 200 receives an indication of a return transaction initiated on point of sale system 402. Based on the relative positions of persons 410 and 425, system 200 determines that person 410 is likely a store clerk operating point of sale system 402 to effectuate a return transaction for person 425. For example, store clerk 410 may have initiated the return transaction on point of sale system 402, but is now operating point of sale system 401 to retrieve additional cash for the return or to otherwise complete the return transaction using point of sale system 401. Since no other persons are located proximate to the other point of sale systems 402-404 that could be assisting customer 425 with the return transaction, system 200 determines that the return transaction initiated on point of sale system 402 is legitimate, and thus does not flag the return transaction as potentially fraudulent.

Figure 5:
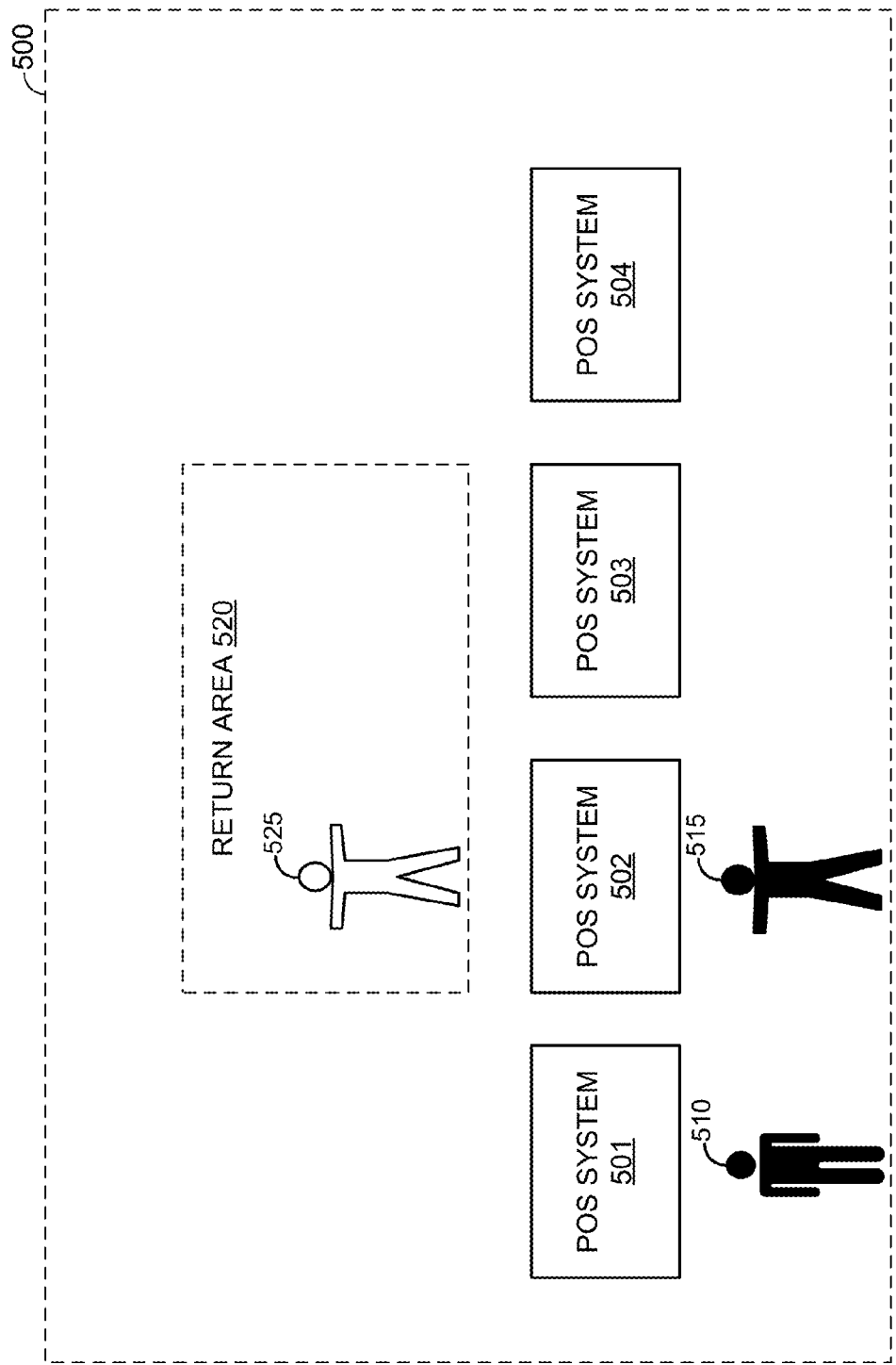
FIG. 5 is a block diagram illustrating a physical area to be analyzed according to an embodiment of the invention, wherein the physical area includes a return area, point of sale systems, and persons located therein.

FIG. 5 is a block diagram illustrating a physical area 500 to be analyzed by the system 200 of FIG. 2 according to an embodiment of the invention. The physical area 500 includes a return area 520, point of sale systems 501-504, and persons 510, 515, and 525 located therein. Person 525 is located within return area 520. Return area 520 can be designated in a number of ways so that system 200 is able to determine the area within physical area 500 that comprises return area 520.

In the example of FIG. 5, person 510 is standing behind point of sale system 501, person 515 is standing behind point of sale system 502, and person 525 is located within return area 520. Based on the relative positions of persons 510, 515, and 525, system 200 determines that persons 510 and 515 are likely store clerks operating respective point of sale systems 501 and 502, while person 525 standing within return area 520 is likely a customer requesting to return an item. In this example, if system 200 receives an indication of a return transaction initiated on point of sale system 501, system 200 would determine that the return transaction is likely fraudulent, since clerk 510 is not helping another customer and clerk 515 appears to be helping person 525. Even if system 200 receives an indication of a return transaction from point of sale system 502, system 200 may flag the return transaction as potentially fraudulent, since although clerk 515 appears to be assisting customer 525 with the return transaction, the absence of another customer proximate to clerk 510 located at point of sale system 501 is suspicious. Thus, this situation is flagged for review by the store owner for possible fraud by the clerks 510 and 515. For example, system 200 could provide a report and/or the video data 206 captured at the time of the return transaction for review by a manager. Finally, if system 200 receives two indications of two separate return transactions from both point of sale systems 501 and 502, system 200 would flag one or both of the return transactions as potentially fraudulent. In particular, the return transaction at point of sale system 501 is suspicious since no customer is standing proximate to clerk 510 and point of sale system 501 to explain why a return transaction might have been initiated at point of sale system 501. Thus, any return transaction at point of sale system 501 in the scenario depicted in FIG. 5 would definitely be flagged by system 200 as potentially fraudulent, and return transactions at point of sale system 502 in this scenario would also be suspicious and could also be flagged as fraudulent for later review.

Figure 6:
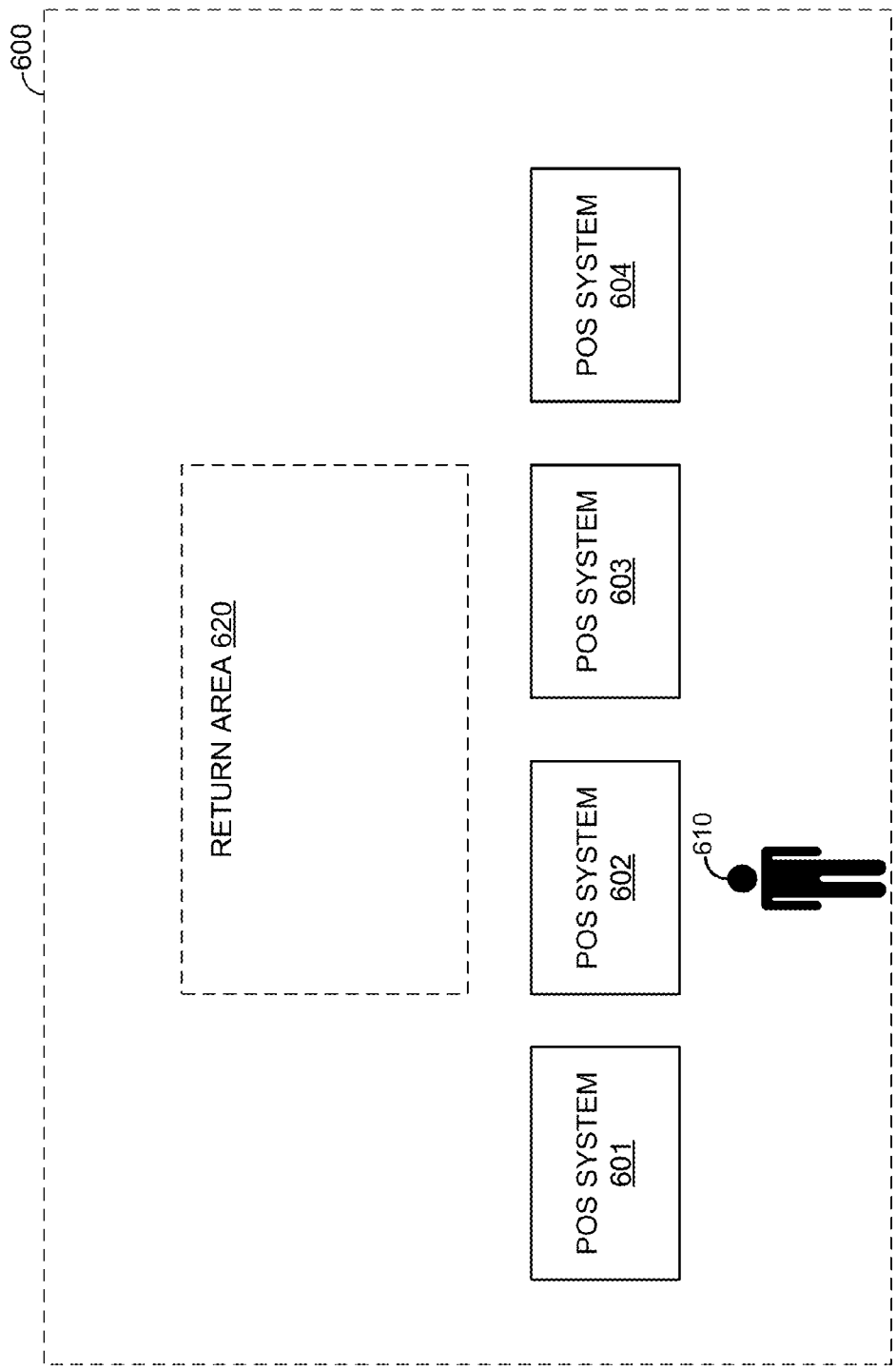
FIG. 6 is a block diagram illustrating a physical area to be analyzed according to an embodiment of the invention, wherein the physical area includes a return area, point of sale systems, and a person located therein.

FIG. 6 is a block diagram illustrating a physical area 600 to be analyzed by the system 200 of FIG. 2 according to an embodiment of the invention. The physical area 600 includes a return area 620, point of sale systems 601-604, and person 610 located therein. Note that in FIG. 6 no person is located within return area 620. Return area 620 can be designated in a number of ways so that system 200 is able to determine the area within physical area 600 that comprises return area 620.

In the example of FIG. 6, person 610 is standing behind point of sale system 601, while no person is located within return area 620. System 200 receives an indication of a return transaction initiated on point of sale system 602. Based on the relative position of person 610 proximate to point of sale system 602, system 200 determines that person 610 is likely a store clerk operating point of sale system 602 to effectuate a return transaction. Since no other person is located within physical area 600, and in particular since no person is located within return area 620 that could be a customer requesting a legitimate return transaction, system 200 determines that the return transaction initiated on point of sale system 602 is likely fraudulent. Thus, system 200 flags the return transaction initiated on point of sale system 602 as potentially fraudulent, so that a manager or store owner can later review the details of the transaction and view the corresponding video that triggered the flag.

Figure 7:
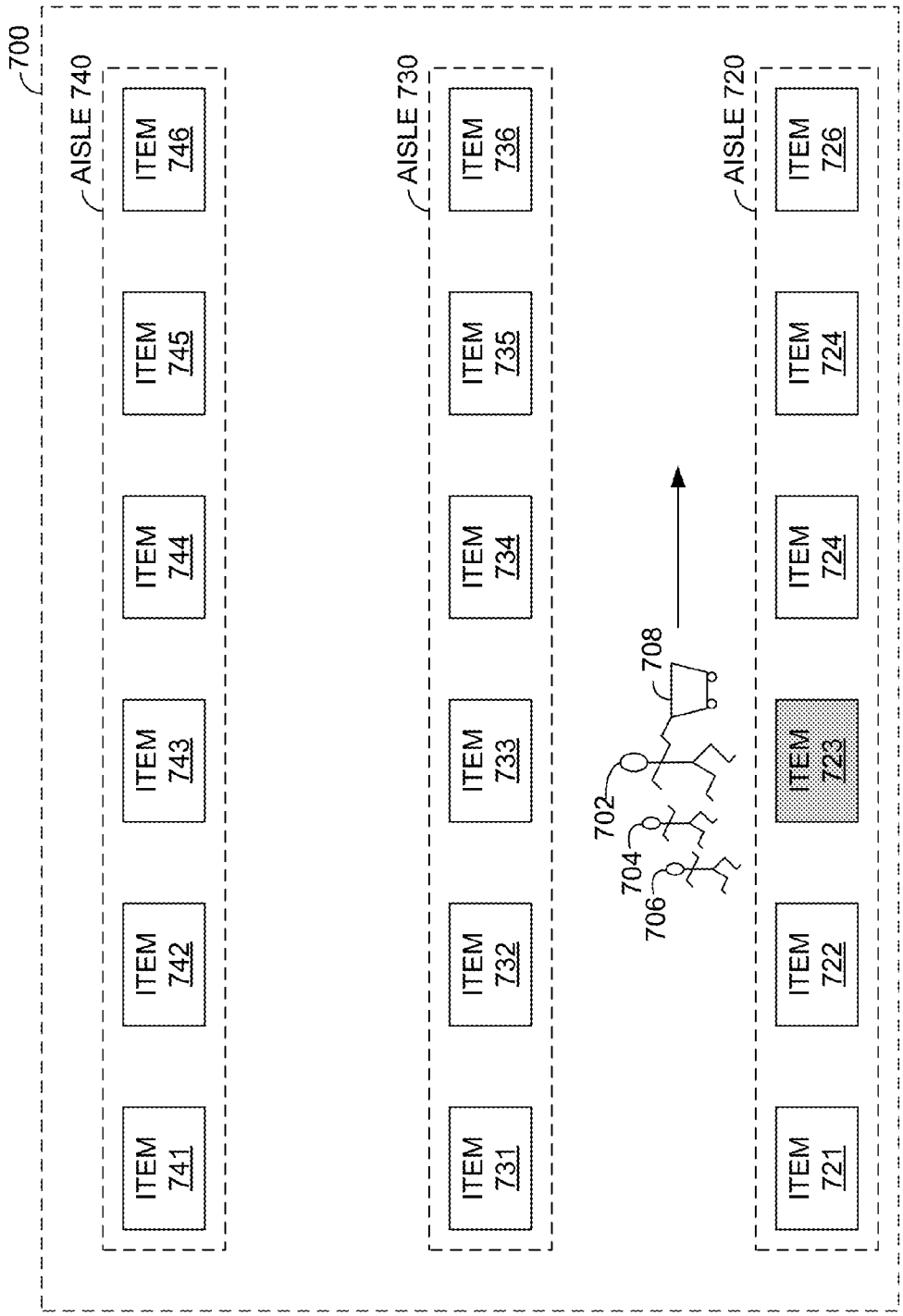
FIG. 7 is a block diagram depicting a physical area to be analyzed according to another embodiment of the invention, showing a number of items therein and indicating movement of people throughout the physical area.

FIG. 7 is a block diagram depicting a physical area 700 to be analyzed by system 200 of FIG. 2 according to another embodiment of the invention, showing a number of items therein and indicating movement of people throughout the area. In particular, physical area 700 is separated by three aisles 720, 730, and 740. Each aisle includes a number of items; aisle 720 includes items 721-726, aisle 730 includes items 731-736, and aisle 740 includes items 741-746. Proximate to aisle 720 are people 702, 704, and 706. Person 702 is pushing shopping cart 708. The items 721-726, 731-736, and 741-746 of FIG. 7 are organized into respective rows or aisles 720, 730, and 740, as might be done in a grocery store or other retail environment. However, any arrangement of the items 721-726, 731-736, and 741-746, including an arbitrary or randomized placement of the items 31721-726, 731-736, and 741-746 within the physical area 700 may be encountered in other embodiments.

Within the physical area 700 of FIG. 7 a person 702 is depicted moving among the items 721-726, 731-736, and 741-746. The person 702 is accompanied by persons 704 and 706, who are smaller in scale and stature than person 702. The person 702 may be a customer of a grocery store or department store viewing a number of the items 721-726, 731-736, and 741-746 for possible purchase. Typically, the person 702 may travel among the items 721-726, 731-736, and 741-746, potentially selecting one or more of the items 721-726, 731-736, and 741-746 for purchase. As described in greater detail below, this movement of the user 702 and the selection of one or more of the items 721-726, 731-736, and 741-746 may be utilized in determining a conversion rate statistic for a particular store, a particular department within a store, a particular shelf or aisle 720, 730, or 740, or even a particular item 721-726, 731-736, and 741-746.

In the environment of FIG. 7, one or more of the video cameras 210 portrayed FIG. 2 may capture or generate video 206 of the persons 702, 704, and 706 as they move through the physical area 700 among the items 721-726, 731-736, and 741-746. The cameras 210 may be located and oriented to provide sufficient coverage of the physical area 700 to capture the movement of the people 702, 704, and 706 among the items 721-726, 731-736, and 741-746 located in the area 700.

The cameras 210 then transfer the video 206 to the processing system 204 of the system 200 via the communication interface 202. The processing system 204 analyzes the video 206 to determine the movement of each person 702, 704, and 706 within the physical area 700. In one example, the video 206 is composed of a series of images, or frames, of some or all of the physical area 700 spanning a period of time. In that context, the processor 204 may employ software configured to detect humans, or a particular feature of humans, such as a head, to detect each person 702, 704, and 706 within each of the frames. This detection allows the processing system 204 to track the movement of the people 702, 704, and 706 within the physical area 700 in relation to the items 721-726, 731-736, and 741-746. In one implementation, the processing system 204 may describe the movement in terms of speed and direction of the persons 702, 704, and 706 at various points in time.

As opposed to using detection of the human form in the video 206, the processing system 204 may instead detect an object closely identified with a person in the physical area 700. In the example of FIG. 7, the person 702 is shown pushing a shopping cart 708, such as that which may be found in a grocery store or similar establishment. Since the person 702 is likely to be located near the cart 708 throughout the majority of the time the person 702 is within the store, the software for determining the movement of the person 702 may be configured to detect the movement of the cart 708 as a proxy for the movement of the corresponding person 702. The processing system 204 may apply the same methodology to track similar containers, such as a hand basket or shopping bag. In other implementations, other objects associated with the person 702 during movement within the physical area 700 may include vehicles, such as motorized shopping carts, cars, golf carts, and so on, used by the person 702 to travel within the area 700.

The processing system 204 may analyze the video 206 to yield the movement of the people 702, 704, and 706 within the physical area 700 in real-time as the video 206 is received by the communication interface 202 from the cameras 210. In another example, the processing system 204 may store the video 206 in a data storage system (not shown in FIG. 2) prior to analyzing the video 206 in a post-processing batch mode.

In the example of FIG. 7, conversion rate statistics can be determined by counting the number of people 702, 704, and 706 entering a designated area 700 or a particular aisle 720, 730, and 740 within the area 700, and correlating this information to actual sales of items 721-726, 731-736, and 741-746. The sales figures of items 721-726, 731-736, and 741-746 could be provided to system 200 via point of sale systems 222 and 223 of FIG. 2 over communication link 225. In this example, physical area 700 could comprise a single department of a retail establishment, or could comprise an entire sales floor of the retail establishment. If the physical area is an entire sales area of a retail establishment, certain sections of the area 700 could be designated as departments and analyzed separately to determine conversion rate statistics per department.

In FIG. 7, system 200 could group persons 702, 704, and 706 together as a single buying unit when determining conversion rate statistics. For example, system 200 could determine that, based on the smaller size and stature of persons 704 and 706, and that the larger person 702 is pushing the shopping cart 708, persons 704 and 706 are likely small children who are shopping with a parent 702. Thus, for purposes of calculating a conversion rate based on the items purchased by persons 702, 704, and 706, the persons 702, 704, and 706 could be treated as a single person 702. This assumption could be altered if system 200 later receives video of each person 702, 704, and 706 purchasing items separately when checking out at point of sale systems 222 and 223.

The persons 702, 704, and 706 are tracked by system 200 in a number of ways. In one example, facial recognition could be used to associate particular facial features of each person 702, 704, and 706 with that respective person 702, 704, and 706. In this manner, the facial information of each person 702, 704, and 706 could be stored for later use by system 200, thus allowing the gathering of data regarding the movement of the people 702, 704, and 706 over any time period such as days, weeks, or years, and including subsequent visits to the area 700. In this manner, the buying habits of persons 702, 704, and 706 could also be tracked by system 200.

In another example, system 200 may identify particular items 721-726, 731-736, and 741-746 that persons 702, 704, and 706 select and carry throughout the physical area 700 prior to purchasing the items 721-726, 731-736, and 741-746. In the example of FIG. 7, persons 702, 704, and 706 have selected item 723 in aisle 720, as shown in FIG. 7 by the darker gray shading of item 723. System 200 could therefore track the persons 702, 704, and 706 by the presence of item 723 in the shopping cart 708, and correlate the purchase of this item 723 by persons 702, 704, and 706 when they leave the physical area 700 and check out at a point of sale system 222 or 223 as shown in FIG. 2. In other examples, system 200 could also be configured to track shoplifters who select an item 721-726, 731-736, and 741-746 but do not purchase the item upon leaving the physical area 700.

Once the data is gathered by system 200 related to persons 702, 704, and 706 who enter particular aisles 720, 730, and 740 or departments of physical area 700, system 200 could calculate a conversion rate statistic for the entire retail establishment, per department of the retail establishment, per aisle 720, 730, or 740, or per item 721-726, 731-736, and 741-746. For example, system 200 could calculate the conversion rate of item 723 by treating persons 702, 704, and 706 as a single buying unit, and therefore the rate is one to one, because one item 723 was purchased by the single buying unit of persons 702, 704, and 706. Typically, a conversion rate is expressed as a percentage of sales relative to a number of shoppers, so in this case, the conversion rate of item 723 is 100% when treating persons 702, 704, and 706 as a single buying unit.

Based on the conversion rate statistics determined by system 200, retailers may determine which products are selling well, and which areas of the store are producing the most sales per shopper. In addition, proprietors can identify more desirable or effective product display locations within a retail establishment that may command greater advertising revenue. For example, certain locations within a store, such as the ends of a product aisle, shelf space approximately aligned at eye-level, and display space near a checkout stand, may attract more customer attention, and hence are likely to produce higher conversion rates for items placed thereon, and this assumption could be verified by the actual conversion rates determined by system 200. Accordingly, the retailers could charge a manufacturer, distributor, or other supplier a higher fee to display products at locations within the store that result in higher conversion rates.

While some higher-profile locations within a retail environment are generally identifiable from past experience, others may be determined by conversion rate statistics of a specific area of a retail establishment, such as a particular aisle 720, 730, or 740, a particular department within the establishment, or even a particular item 721-726, 731-736, and 741-746 for sale within the retail establishment. Based on these more granular conversion rate statistics, the retailer may then allocate or apportion a greater portion of the advertising or display costs to suppliers of products that are located along the identified areas.

Figure 8:
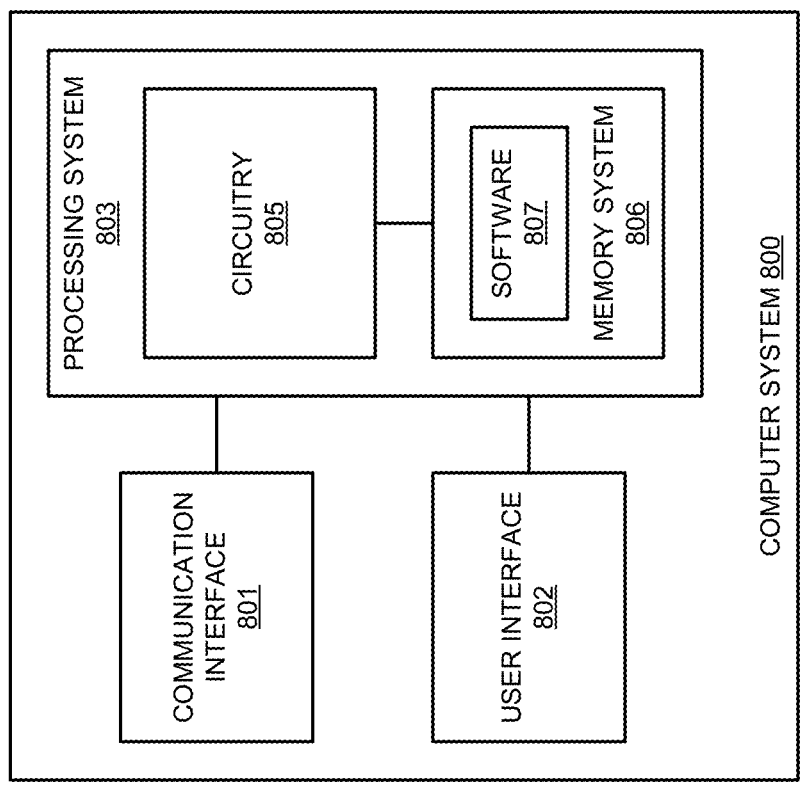
FIG. 8 is a block diagram of a computer system employable as the system of FIG. 2.

FIG. 8 illustrates a block diagram of a computer system 800. Computer system 800 provides an example of the system 200 of FIG. 2, although system 200 could use alternative configurations. Computer system 800 includes communication interface 801, user interface 802, and processing system 803. Processing system 803 is linked to communication interface 801 and user interface 802. Processing system 803 includes processing circuitry 805 and memory system 806 that stores operating software 807. Operating software 807 includes processing instructions to be executed by the processing system 803 to perform the various functions described above for system 200. Computer system 800 could include a programmed general-purpose computer, although those skilled in the art will appreciate that programmable or special purpose circuitry and equipment may be used. Computer system 800 may be distributed among multiple devices that together include elements 801-807.

Communication interface 801 comprises components that communicate over communication links, such as network cards, transceivers, ports, RF transceivers, processing circuitry and software, or some other communication components. Communication interface 801 may be configured to communicate over metallic, wireless, or optical links. Communication interface 801 may be configured to use time-division multiplexing (TDM), Internet Protocol (IP), Ethernet, optical networking, wireless protocols, communication signaling, or some other communication format—including combinations thereof. In some examples, communication interface 801 could include a network interface, modem, port, transceiver, or some other communication device, as well as the communication interface 202 of FIG. 2 for receiving video information 206 as described above. Communication interface 801 may be distributed among multiple communication devices. Communication interface 801 is configured to receive an indication of a return transaction from a point of sale system, wherein the indication of the return transaction indicates a time when the return transaction occurred. Communication interface 801 is further configured to receive video data of an area proximate to the point of sale system captured at the time when the return transaction occurred.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 could also include a keyboard, mouse, voice recognition interface, graphical display, or some other type of user device. User interface 802 could be distributed among multiple user devices. User interface 802 may be omitted in some examples.

Processing circuitry 805 comprises a microprocessor, logic circuits, or other circuitry that retrieves and executes operating software 807 from memory system 806. Processing circuitry 805 may comprise a single device or could be distributed across multiple devices—including devices in different geographic areas. Processing circuitry 805 may be embedded in various types of equipment. Memory system 806 comprises a non-transitory computer readable storage medium, such as a disk drive, flash drive, data storage circuitry, or some other hardware memory apparatus. Memory system 806 may comprise a single device or could be distributed across multiple devices—including devices in different geographic areas. Memory system 806 may be embedded in various types of equipment. Operating software 807 comprises computer programs, firmware, or some other form of machine-readable processing instructions. Operating software 807 may include an operating system, utilities, drivers, network interfaces, applications, or some other type of software.

When executed by circuitry 805, operating software 807 directs processing system 803 to operate as described herein for system 200 with respect to FIGS. 1-7. In particular, operating software 807 may direct processing system 803 to direct communication interface 801 to receive an indication of a return transaction from a point of sale system, wherein the indication of the return transaction indicates a time when the return transaction occurred. Further, operating software 807 may direct processing system 803 to direct communication interface 801 to receive video data of an area proximate to the point of sale system captured at the time when the return transaction occurred. In addition, operating software 807 may direct processing system 803 to process the video data to determine whether a first person is located in a return area and whether a second person is located proximate to the point of sale system. Operating software 807 may direct processing system 803 to determine that the return transaction is legitimate if the first person is located in the return area and the second person is located proximate to the point of sale system, or if the first person is located in the return area, no person is located proximate to the point of sale system, and the second person is located proximate to a different point of sale system. Finally, operating software 807 may direct processing system 803 to flag the return transaction as potentially fraudulent if the first person is located in the return area, the second person is located proximate to the different point of sale system, and a third person is located proximate to the point of sale system, flagging the return transaction as potentially fraudulent, or if the first person is not located in the return area and the second person is located proximate to the point of sale system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a video system to detect fraudulent return transactions, the method comprising:
   receiving an indication of a return transaction from a point of sale system, wherein the indication of the return transaction indicates a time when the return transaction occurred;
   receiving video data of an area proximate to the point of sale system captured at the time when the return transaction occurred;
   processing, by a processor, the video data to determine whether a first person is located in a return area and whether a second person is located proximate to the point of sale system; and
   determining, by the processor, whether the return transaction is legitimate or fraudulent based on whether the first person is located in the return area and whether the second person is located proximate to the point of sale system;
   wherein determining whether the return transaction is legitimate or fraudulent based on whether the first person is located in the return area and whether the second person is located proximate to the point of sale system comprises flagging, by the processor, the return transaction as potentially fraudulent when the first person is located in the return area, the second person is located proximate to the different point of sale system, and a third person is located proximate to the point of sale system.

2. The method of claim 1 wherein determining whether the return transaction is legitimate or fraudulent based on whether the first person is located in the return area and whether the second person is located proximate to the point of sale system comprises determining, by the processor, that the return transaction is legitimate when the first person is located in the return area and the second person is located proximate to the point of sale system.

3. The method of claim 1 wherein determining whether the return transaction is legitimate or fraudulent based on whether the first person is located in the return area and whether the second person is located proximate to the point of sale system comprises determining, by the processor, that the return transaction is legitimate when the first person is located in the return area, no person is located proximate to the point of sale system, and the second person is located proximate to a different point of sale system.

4. The method of claim 1 wherein determining whether the return transaction is legitimate or fraudulent based on whether the first person is located in the return area and whether the second person is located proximate to the point of sale system comprises flagging, by the processor, the return transaction as potentially fraudulent when the first person is not located in the return area and the second person is located proximate to the point of sale system.

5. The method of claim 1 further comprising providing the return transaction for review if the return transaction is determined to be fraudulent.

6. The method of claim 1 wherein receiving the video data of the area proximate to the point of sale system captured at the time when the return transaction occurred comprises, in response to receiving the indication of the return transaction from the point of sale system, requesting the video data captured at the time when the return transaction occurred and responsively receiving the video data of the area proximate to the point of sale system captured at the time when the return transaction occurred.

7. The method of claim 1 wherein processing the video data to determine whether the first person is located in the return area and whether the second person is located proximate to the point of sale system comprises analyzing, by the processor, the video data to identify the return area and an area proximate to the point of sale system.

8. The method of claim 7 wherein analyzing the video data to identify the return area comprises analyzing, by the processor, the video data to recognize predetermined coordinates of the return area relative to the video data.

9. A non-transitory computer-readable medium having program instructions stored thereon for operating a video system to detect fraudulent return transactions, wherein the program instructions, when executed by a computer system, direct the computer system to:
   receive an indication of a return transaction from a point of sale system, wherein the indication of the return transaction indicates a time when the return transaction occurred;
   receive video data of an area proximate to the point of sale system captured at the time when the return transaction occurred;
   process the video data to determine whether a first person is located in a return area and whether a second person is located proximate to the point of sale system; and
   determine whether the return transaction is legitimate or fraudulent based on whether the first person is located in the return area and whether the second person is located proximate to the point of sale system;
   wherein the program instructions, to direct the computer system to determine whether the return transaction is legitimate or fraudulent based on whether the first person is located in the return area and whether the second person is located proximate to the point of sale system, instruct the computer system to flag the return transaction as potentially fraudulent when the first person is located in the return area, the second person is located proximate to the different point of sale system, and a third person is located proximate to the point of sale system.

10. The non-transitory computer-readable medium of claim 9 wherein the program instructions, to direct the computer system to determine whether the return transaction is legitimate or fraudulent based on whether the first person is located in the return area and whether the second person is located proximate to the point of sale system, instruct the computer system to determine that the return transaction is legitimate when the first person is located in the return area and the second person is located proximate to the point of sale system.

11. The non-transitory computer-readable medium of claim 9 wherein the program instructions, to direct the computer system to determine whether the return transaction is legitimate or fraudulent based on whether the first person is located in the return area and whether the second person is located proximate to the point of sale system, instructs the computer system to determine that the return transaction is legitimate when the first person is located in the return area, no person is located proximate to the point of sale system, and the second person is located proximate to a different point of sale system.

12. The non-transitory computer-readable medium of claim 9 wherein the program instructions, to direct the computer system to determine whether the return transaction is legitimate or fraudulent based on whether the first person is located in the return area and whether the second person is located proximate to the point of sale system, instruct the computer system to flag the return transaction as potentially fraudulent when the first person is not located in the return area and the second person is located proximate to the point of sale system.

13. The non-transitory computer-readable medium of claim 9 further comprising the program instructions configured to direct the computer system to provide the return transaction for review if the return transaction is determined to be fraudulent.

14. The non-transitory computer-readable medium of claim 9 wherein the program instructions, to direct the computer system to receive the video data of the area proximate to the point of sale system captured at the time when the return transaction occurred, instruct the computer system to, in response to receiving the indication of the return transaction from the point of sale system, request the video data captured at the time when the return transaction occurred and responsively receive the video data of the area proximate to the point of sale system captured at the time when the return transaction occurred.

15. The non-transitory computer-readable medium of claim 9 wherein the program instructions, to direct the computer system to process the video data to determine whether the first person is located in the return area and whether the second person is located proximate to the point of sale system, instruct the computer system to analyze the video data to identify the return area and an area proximate to the point of sale system.

16. The non-transitory computer-readable medium of claim 15 wherein the program instructions, to direct the computer system to analyze the video data to identify the return area, instruct the computer system to analyze the video data to recognize predetermined coordinates of the return area relative to the video data.

17. A method of operating a video system to detect fraudulent return transactions, the method comprising:

receiving an indication of a return transaction from a point of sale system, wherein the indication of the return transaction indicates a time when the return transaction occurred;

receiving video data of an area proximate to the point of sale system captured at the time when the return transaction occurred;

processing, by a processor, the video data to determine whether a first person is located in a return area and whether a second person is located proximate to the point of sale system;

if the first person is located in the return area and the second person is located proximate to the point of sale system, determining that the return transaction is legitimate;

if the first person is located in the return area, no person is located proximate to the point of sale system, and the second person is located proximate to a different point of sale system, determining, by the processor, that the return transaction is legitimate;

if the first person is located in the return area, the second person is located proximate to the different point of sale system, and a third person is located proximate to the point of sale system, flagging, by the processor, the return transaction as potentially fraudulent; and if the first person is not located in the return area and the second person is located proximate to the point of sale system, flagging, by the processor, the return transaction as potentially fraudulent.

18. The method of claim 17 wherein processing the video data to determine whether the first person is located in the return area and whether the second person is located proximate to the point of sale system comprises analyzing, by the processor, the video data to identify the return area and an area proximate to the point of sale system.

* * * * *